(12) United States Patent
Stevens

(10) Patent No.: US 7,350,734 B2
(45) Date of Patent: Apr. 1, 2008

(54) SEAT BELT PRETENSIONER

(75) Inventor: Bruce A. Stevens, Oakland, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 0 days.

(21) Appl. No.: 11/251,168

(22) Filed: Oct. 13, 2005

(65) Prior Publication Data

US 2007/0085318 A1     Apr. 19, 2007

(51) Int. Cl.
*B65H 75/48* (2006.01)

(52) U.S. Cl. ............... 242/374; 280/806; 297/478; 297/480

(58) Field of Classification Search ................ 242/374; 280/806; 297/478, 480
See application file for complete search history.

(56) References Cited

U.S. PATENT DOCUMENTS

| | | | | |
|---|---|---|---|---|
| 3,645,549 A | 2/1972 | Jantzen | ...................... | 297/388 |
| 3,871,683 A | 3/1975 | Otani | ......................... | 280/150 |
| 3,879,054 A | 4/1975 | Lindblad | ................... | 280/150 |
| 4,023,427 A | 5/1977 | Beier | ......................... | 74/242.1 |
| 4,186,942 A | 2/1980 | Pater | ......................... | 280/804 |
| 4,232,885 A | 11/1980 | Suzuki et al. | ................ | 280/804 |
| 4,290,564 A | 9/1981 | Karlsson | ..................... | 242/107 |
| 4,294,468 A | 10/1981 | Kinaga et al. | ............... | 280/807 |
| 4,310,176 A | 1/1982 | Furusawa et al. | ........... | 280/801 |
| 4,322,096 A | 3/1982 | Higbee et al. | .............. | 280/804 |
| 4,345,780 A | 8/1982 | Moriya et al. | .............. | 280/802 |
| 4,491,343 A | 1/1985 | Fohl | ........................... | 280/801 |
| 4,494,709 A | 1/1985 | Takata | ...................... | 242/107.6 |
| 4,558,832 A | 12/1985 | Nilsson | ...................... | 242/374 |
| 4,597,546 A | 7/1986 | Yamamoto et al. | ......... | 242/382.2 |
| 4,597,586 A | 7/1986 | Burghardt et al. | .......... | 280/806 |
| 4,615,540 A | 10/1986 | Sedlmayr et al. | ........... | 280/806 |
| 4,647,071 A | 3/1987 | Tabata | ......................... | 280/806 |
| 4,750,759 A | 6/1988 | Escaravage | ................. | 280/806 |
| 4,938,535 A | 7/1990 | Condon et al. | ............. | 297/483 |
| 5,004,178 A * | 4/1991 | Kobayashi et al. | ......... | 242/381.1 |
| 5,035,757 A | 7/1991 | Poole | ........................... | 149/46 |
| 5,275,437 A * | 1/1994 | Modinger et al. | .......... | 280/806 |
| 5,294,150 A | 3/1994 | Steffens, Jr. | ................. | 280/801 |
| 5,330,228 A | 7/1994 | Krebs et al. | .............. | 280/801.2 |
| 5,346,152 A | 9/1994 | Fohl | ........................... | 242/371 |
| 5,374,110 A | 12/1994 | Hiramatsu | ................... | 297/480 |
| 5,409,176 A | 4/1995 | Kopetzky | ................. | 424/375.3 |

(Continued)

FOREIGN PATENT DOCUMENTS

GB     WO 8901430     * 2/1989

*Primary Examiner*—Peter M. Cuomo
*Assistant Examiner*—Sang Kim
(74) *Attorney, Agent, or Firm*—L.C. Begin & Associates, PLLC

(57) ABSTRACT

An in-line seat belt pretensioner is provided that includes a frame containing a first guide member and a second guide member for tensioning of seat belt webbing upon pretensioner activation. As the pretensioner is activated, the seat belt is tensioned by activation of an actuator operably coupled to the second guide. The second guide is then routed over a vertically stationary first guide that is slidably engaged within a slot within the frame, thereby contributing to reducing the load on the occupant. A low-friction material employed in the manufacture of the guide member(s), contributes to a smoother and less abrupt tensioning of the seat belt upon activation of the pretensioner.

16 Claims, 6 Drawing Sheets

U.S. PATENT DOCUMENTS

| | | |
|---|---|---|
| 5,411,292 A | 5/1995 | Collins et al. ............... 280/806 |
| 5,451,008 A | 9/1995 | Hamaue ..................... 242/374 |
| 5,460,668 A | 10/1995 | Lyon ......................... 149/36 |
| 5,492,368 A | 2/1996 | Pywell et al. ................ 280/806 |
| 5,542,697 A | 8/1996 | Fohl .......................... 280/806 |
| 5,544,917 A | 8/1996 | Loxton et al. ............. 280/801.2 |
| 5,553,803 A | 9/1996 | Mitzkus et al. .............. 242/374 |
| 5,588,608 A * | 12/1996 | Imai et al. .................. 242/374 |
| 5,624,084 A | 4/1997 | Kopetzky et al. ........ 242/375.3 |
| 5,667,161 A | 9/1997 | Mitzkus et al. .............. 242/374 |
| 5,671,946 A | 9/1997 | Whalen et al. ............. 280/741 |
| 5,743,480 A | 4/1998 | Kopetzky et al. ........... 242/374 |
| 5,756,929 A | 5/1998 | Lundstrom et al. ........... 149/22 |
| 5,806,888 A | 9/1998 | Adamini ..................... 280/741 |
| 5,872,329 A | 2/1999 | Burns et al. ................. 149/36 |
| 6,036,274 A | 3/2000 | Kohlndorfer et al. ....... 297/480 |
| 6,145,881 A | 11/2000 | Miller, III et al. .......... 280/806 |
| 6,213,513 B1 | 4/2001 | Grabowski et al. ......... 280/806 |
| 6,322,140 B1 | 11/2001 | Jessup et al. .......... 297/216.17 |
| 6,340,176 B1 | 1/2002 | Webber et al. ............... 280/806 |
| 6,341,799 B1 | 1/2002 | Furusawa et al. ........... 280/736 |
| 6,409,217 B1 | 6/2002 | Denis ........................ 280/806 |
| 6,416,008 B1 | 7/2002 | Fujii et al. ................ 242/379.1 |
| 6,419,177 B2 | 7/2002 | Stevens ...................... 242/374 |
| 6,419,271 B1 | 7/2002 | Yamada et al. ............. 280/806 |
| 6,505,790 B2 | 1/2003 | Stevens ...................... 242/374 |
| 6,527,298 B2 | 3/2003 | Kopetzky ................... 280/806 |
| 6,527,299 B2 | 3/2003 | Specht et al. ............... 280/806 |
| 6,565,121 B2 | 5/2003 | Knych et al. ............... 280/806 |
| 6,702,219 B2 | 3/2004 | Tanji ....................... 242/390.8 |
| 6,752,421 B2 | 6/2004 | Khandhadia et al. ....... 280/741 |
| 6,769,716 B2 | 8/2004 | Rouhana et al. ............ 280/806 |
| 6,789,485 B2 | 9/2004 | Moquin et al. ............. 102/530 |
| 6,793,249 B2 | 9/2004 | Lobert et al. ............... 280/806 |

\* cited by examiner

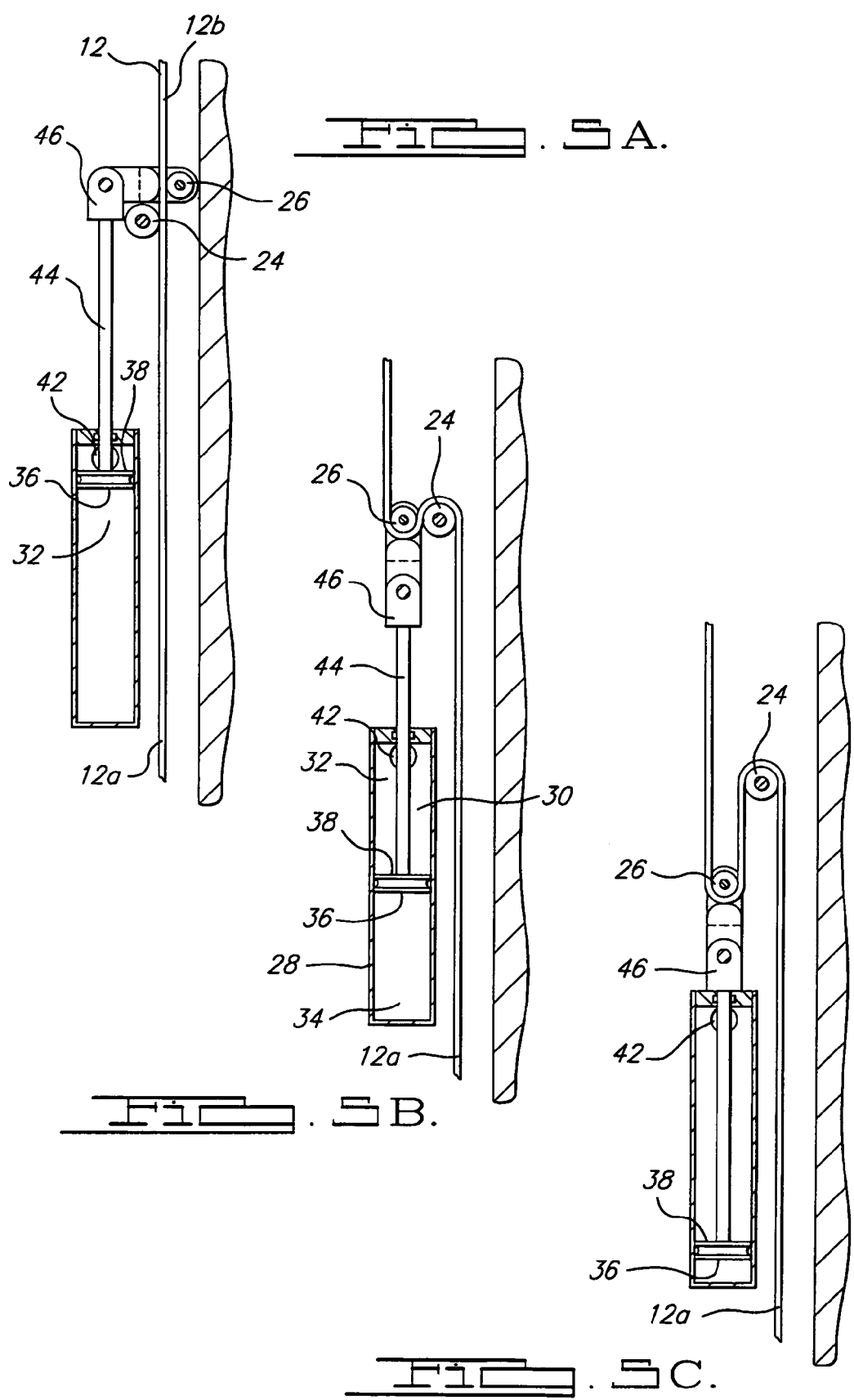

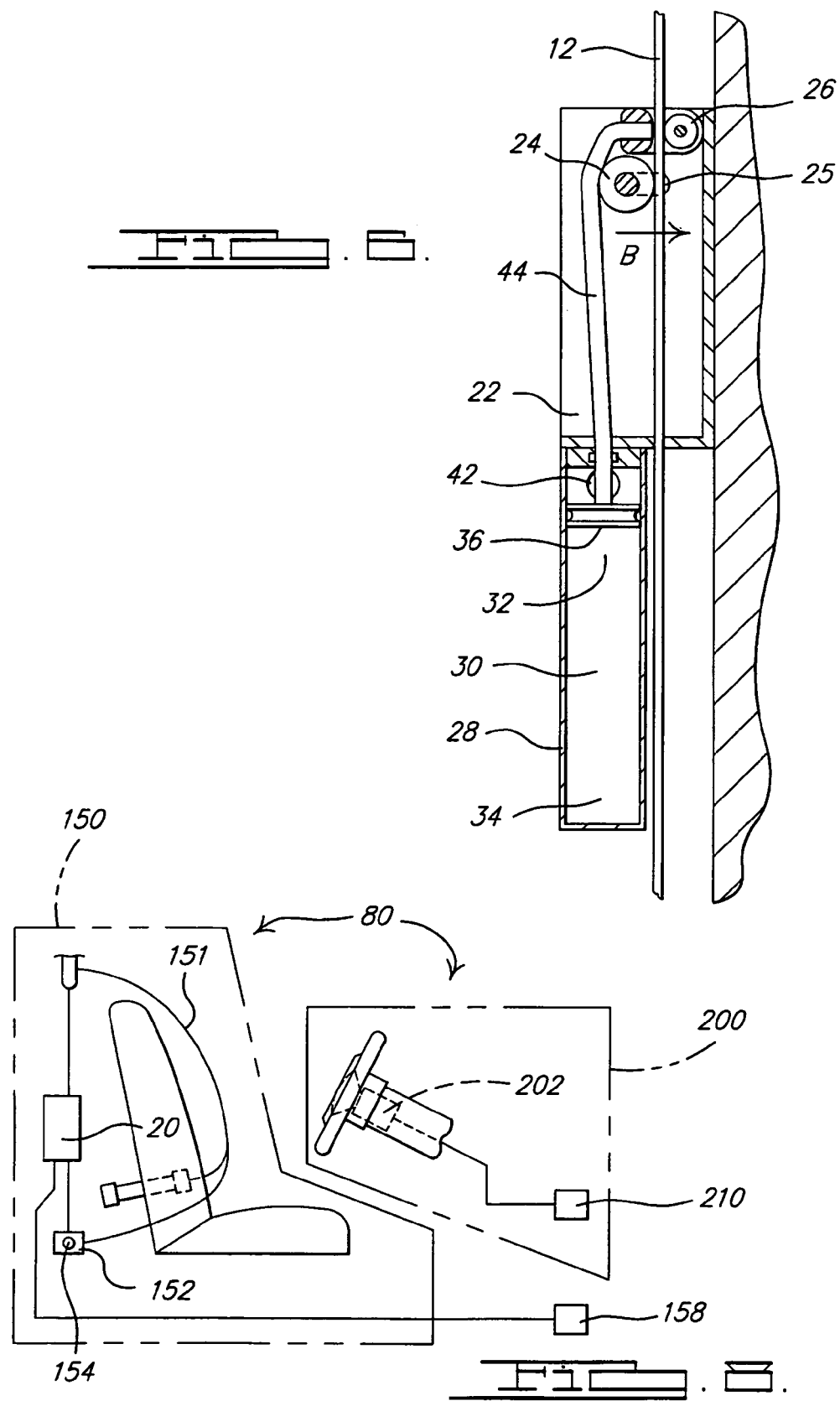

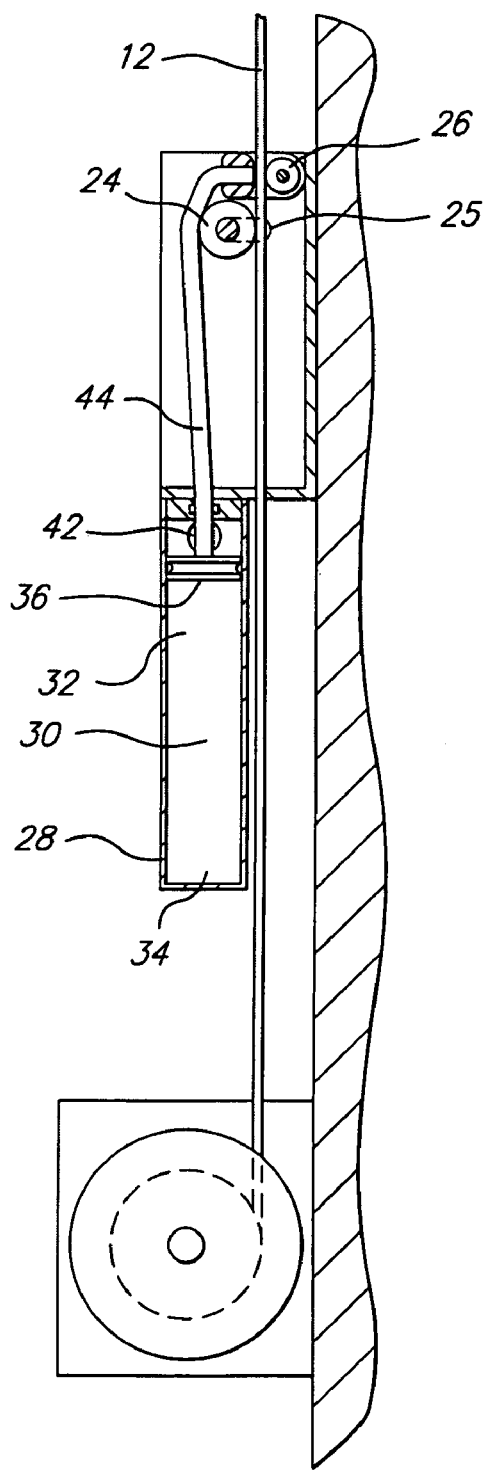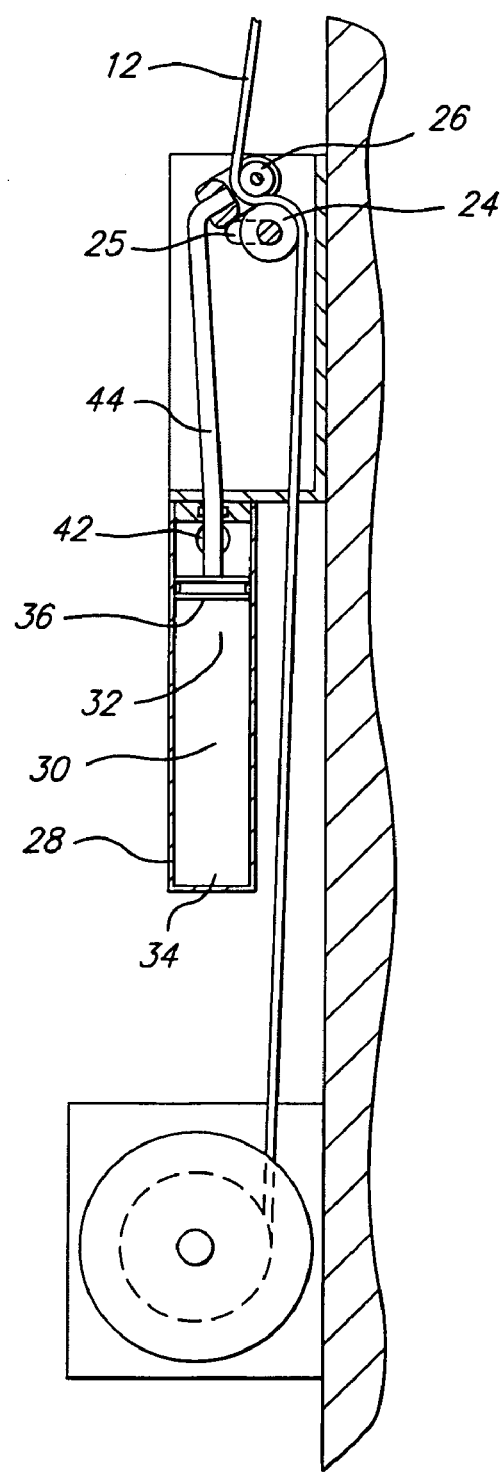

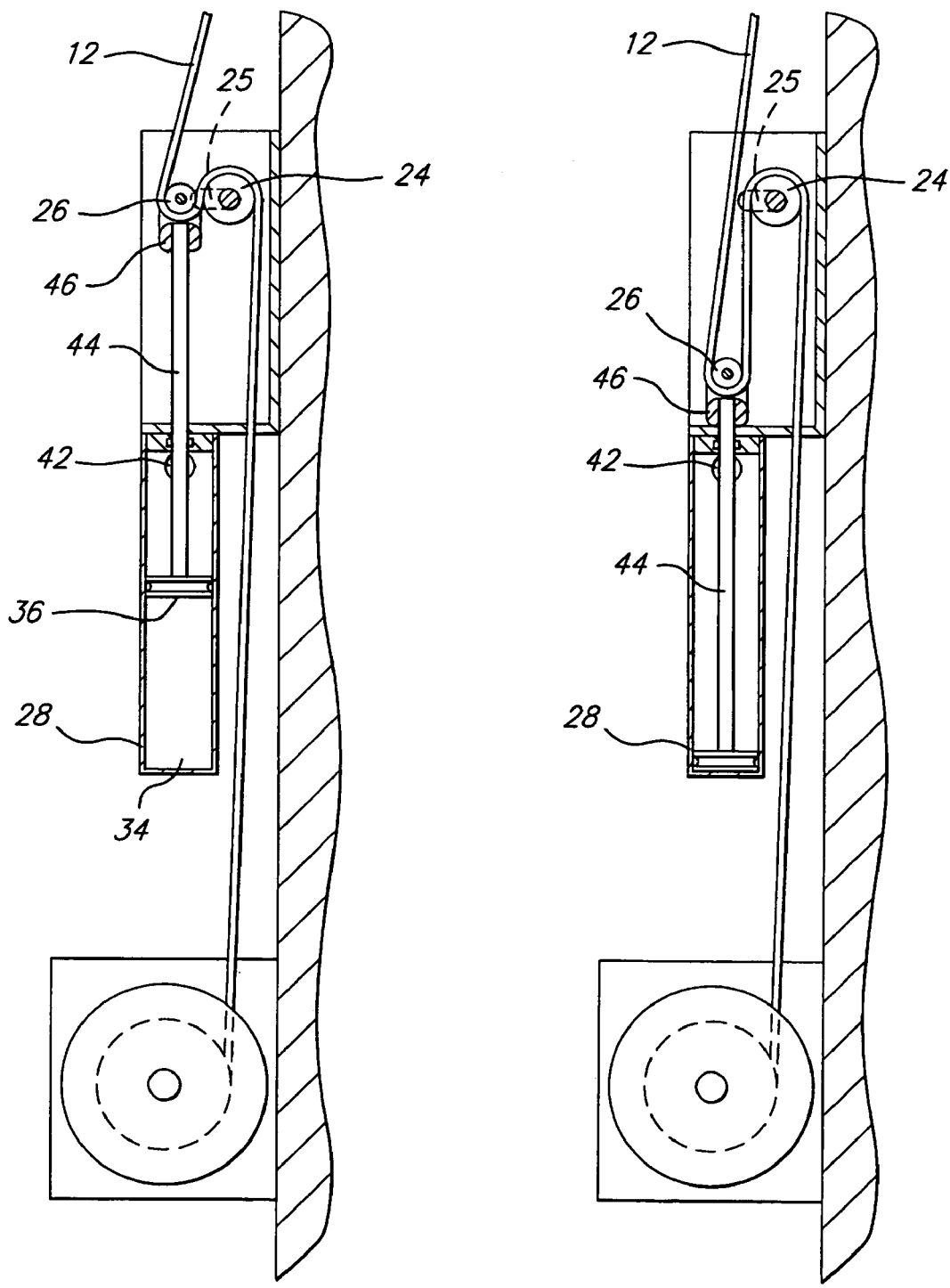

SEAT BELT PRETENSIONER

BACKGROUND OF THE INVENTION

Safety belt pretensioners remove slack from a safety belt in the event of a collision in order to minimize forward movement of the passenger. It is known to use pyrotechnic gas generators to operate pretensioner mechanisms that wind up or otherwise pull in slack in the safety belt during a collision. Such pyrotechnic gas generators are often disposed internally of a safety belt retractor. High-temperature gases tend to abrade interior metal surfaces and produce ash and clinkers that bind up the retraction mechanism. Thus, the vehicle owner is faced with a significant cost penalty in that the entire pretensioner and retractor assembly must be replaced after activation because of the inability to prevent degradation of the retractor.

Further, where pyrotechnic gas generators are used to supply the rapidly increasing gas pressure for the pretensioner, the gas pressurization rate and the resultant initial driving force or acceleration of the piston can exceed the structural capability of the driven components. As a result, the entire pretensioner assembly can malfunction due to fracturing of a given part. If damaged due to application of excessive forces, the retractor will not retract and function as a load limiter during a second impact. Thus, the retractor must be replaced.

In addition, many existing retractor designs incorporate the pretensioner into the retractor assembly. In these designs, the retractor tends to occupy valuable space in the retractor assembly that could be used for other useful mechanisms, such as load-limiting devices.

SUMMARY OF THE INVENTION

The present invention provides a safety belt pretensioner that works independently of the safety belt retractor. Prior to function, it remains operatively independent from safety belt or retractor operations. During a collision, and when the retractor locks up the safety spool during impact, the pretensioner assembly pulls in safety belt webbing from the shoulder loop direction. After the collision, the safety belt is free to slide through the pretensioner assembly for load-limiting webbing payout, or post-impact belt take-up by the retractor.

The pretensioner assembly embodiments disclosed herein obviate damage to the retractor due to chemical abrasion and application of excessive forces. Also, as the pretensioner assembly disclosed herein is positioned separate from the retractor, it does not occupy space in the retractor assembly, thereby permitting a corresponding reduction in the size of the retractor assembly.

BRIEF DESCRIPTION OF THE DRAWINGS

FIGS. 5A-5C are edge views of a second embodiment of the pretensioner assembly, showing construction and operation of the second embodiment;

FIG. 6 is an edge view of a third embodiment of an in-line safety belt pretensioner assembly in accordance with the present invention wherein a roller is slidably engaged within a slot formed in the activation mechanism;

FIG. 7A-7D are edge views of the third embodiment of the pretensioner assembly shown in FIG. 6, showing operation of the third embodiment; and FIG. 8 is a schematic representation of an exemplary vehicle occupant restraint system incorporating a pretensioner assembly in accordance with the present invention.

DETAILED DESCRIPTION

Figure 1:
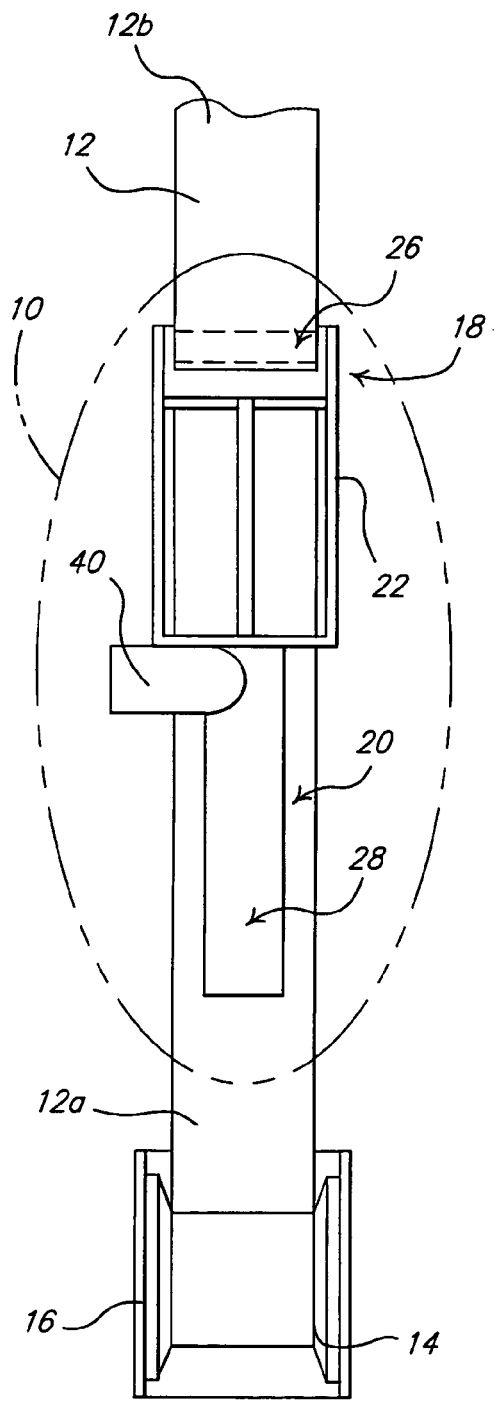
FIG. 1 is a side view of a first embodiment of an in-line safety belt pretensioner assembly in accordance with the present invention.
Figure 2:
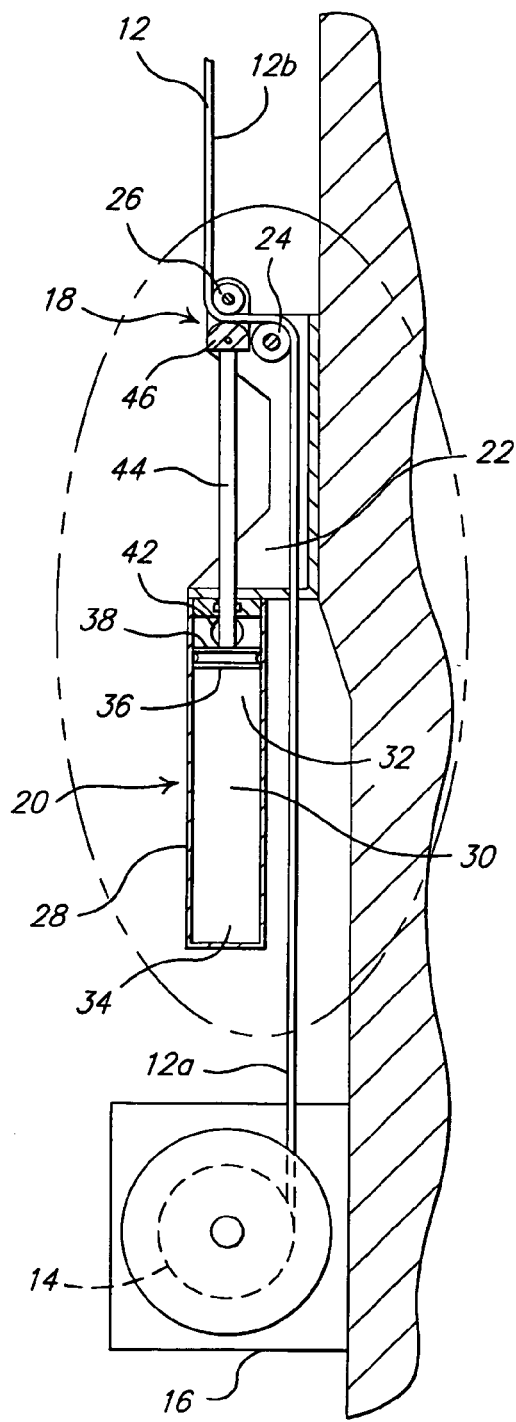
FIG. 2 is a partially cross-sectioned edge view of the pretensioner assembly of FIG. 1.

FIGS. 1 and 2 show a pretensioner assembly 10 in accordance with a first embodiment of the present invention. Pretensioner assembly 10 may be used to pretension a safety belt 12 wound about a webbing reel 14 of a conventional safety belt retractor mechanism 16. "Pretensioning" is generally defined as tightening the slack in a safety belt in the event of sudden deceleration or a collision.

During safety belt use, the belt is typically anchored to the interior of a vehicle by retractor mechanism 16 at one end of the belt and by a safety belt buckle mechanism (not shown) at an opposite end of the belt. Safety belt 12 may also pass through an intermediate guiding member, such as a shoulder loop (not shown) positioned between pretensioner assembly 10 and the buckle mechanism.

Pretensioner assembly 10 may be characterized as an "in-line" assembly because it is positioned and acts along a portion of safety belt 12 extending between retractor 16 and the buckle mechanism, rather than being incorporated into the retractor mechanism as in previous designs. For example, pretensioner assembly may be located in the vehicle B pillar between the retractor and the shoulder loop.

Typical safety belt retractor mechanisms which may be used in conjunction with the pretensioner assembly of the present invention are described in U.S. Pat. Nos. 5,743,480, 5,553,803, 5,667,161, 5,451,008, 4,558,832 and 4,597,546, each incorporated herein by reference.

Referring again to FIGS. 1 and 2, pretensioner assembly 10 includes a pretensioner mechanism, generally designated 18, and an activation mechanism 20 operably coupled to pretensioner mechanism 18 for actuating the pretensioner mechanism. Pretensioner mechanism 18 includes a frame 22, a first guide member 24 secured to frame 22, and a second guide member 26 operably coupled to the frame so as to enable movement of the second guide member 26 with respect to first guide member 24. In the embodiment shown in FIGS. 1 and 2, frame 22 is a unitary block 16 formed from steel, aluminum, metal alloys, plastic and/or other known materials suitable for use in a pretensioner and for attachment of the components described below. Frame 22 will generally (but not exclusively) be secured to an interior portion of the vehicle.

Either (or both) of guide members 24, 26 may be statically mounted or rotatably mounted to respective portions of pretensioner assembly 10. In the embodiment shown in FIGS. 1 and 2, guide members 24, 26 each comprise a roller rotatably secured to frame 22 or another portion of pretensioner assembly 10. Alternatively, either of guide members 24, 26 may comprise a statically mounted bushing. Generally, portions of guide members 24, 26 in contact with safety belt 12 are formed from a relatively low-friction material, for example, a polymer compound. In contrast to comparable pretensioners, therefore, the present pretensioner is designed to operate with less friction about the guide member/seat belt interface thereby improving the gradual tensioning of the seat belt as opposed to an abrupt tensioning upon pretensioner activation.

In the embodiment shown in FIG. 1, second guide member 26 is operably coupled to frame 22 through activation mechanism 20, in a manner described in more detail below. In alternative embodiments, second guide member 26 may be coupled to frame 22 using one of many other alternative methods (not shown). For example, second guide member 26 may be attached by a hinge to frame 22. Or, as shown in FIG. 6, guide member 26 may be slidably positioned in a slot formed in frame 22 thereby providing a packaging advantage in that the unit is relatively smaller than comparable pretensioners. The slot also may function to permit a load-limiting function of guide member 26, whereby when weight is exerted on the belt, guide member 26 retracts in the slotted position to release a small amount of belt webbing thereby partially absorbing the impact force on the occupant.

A first portion 12a of safety belt 12 is coiled about first guide member 24 and extends between a first safety belt securement (for example, a retractor mechanism in the embodiment shown) and second guide member 26. Similarly, a second portion 12b of safety belt 12 is coiled about second guide member 26 and extends between a first guide member 24 and a second safety belt securement (for example, a safety belt buckle mechanism, not shown).

A detent mechanism, generally designated 46, is provided for releasably securing second guide member 26 in a first position with respect to first guide member 24 prior to pretensioner activation. Detent mechanism 46 may comprise, for example, a shear pin in engagement with second guide member 26 and with another member (for example, frame 22 or an interior portion of the vehicle) that is mounted in a fixed spatial relationship with first guide member 24. In another example, detent mechanism 46 comprises a deformation (for example, a crimp) in a surface of second guide member 26 in engagement with a corresponding deformation in a surface of another member mounted in a fixed spatial relationship with first guide member 24.

Referring again to FIGS. 1 and 2, activation mechanism 20 includes a longitudinal housing 28 with at least one cylindrical passage 30 formed therein. Passage 30 has a first end 32 and a second end 34. In the embodiment shown, housing 28 is secured to pretensioner mechanism frame 22. However, housing 28 may alternatively be secured to another suitable portion of the vehicle interior. Housing 28 is may be formed from steel, aluminum, metal alloys, and/or other known materials suitable for use in a pressure resistant vessel or piston housing.

An actuator or piston 36 is movable in housing passage 30 and has a pressure surface 38 formed thereon. In the embodiment shown, actuator 36 is essentially cylindrical and is slidingly received in cylindrical passage 30 in housing 28. Actuator 36 may be die cast, molded, or otherwise formed from metal, plastics, other suitably rigid materials, and combinations thereof. Actuator 36 might be constructed as a single piece or, alternatively, as a plurality of pieces or segments.

It should be appreciated that neither actuator 36 nor housing passage 28 need be cylindrical, and various deviations from the design of the disclosed embodiments might be made without departing from the scope of the present invention. For instance, actuator 36 and passage 30 might be flat-sided, or even rectangular in cross section.

Figure 4:
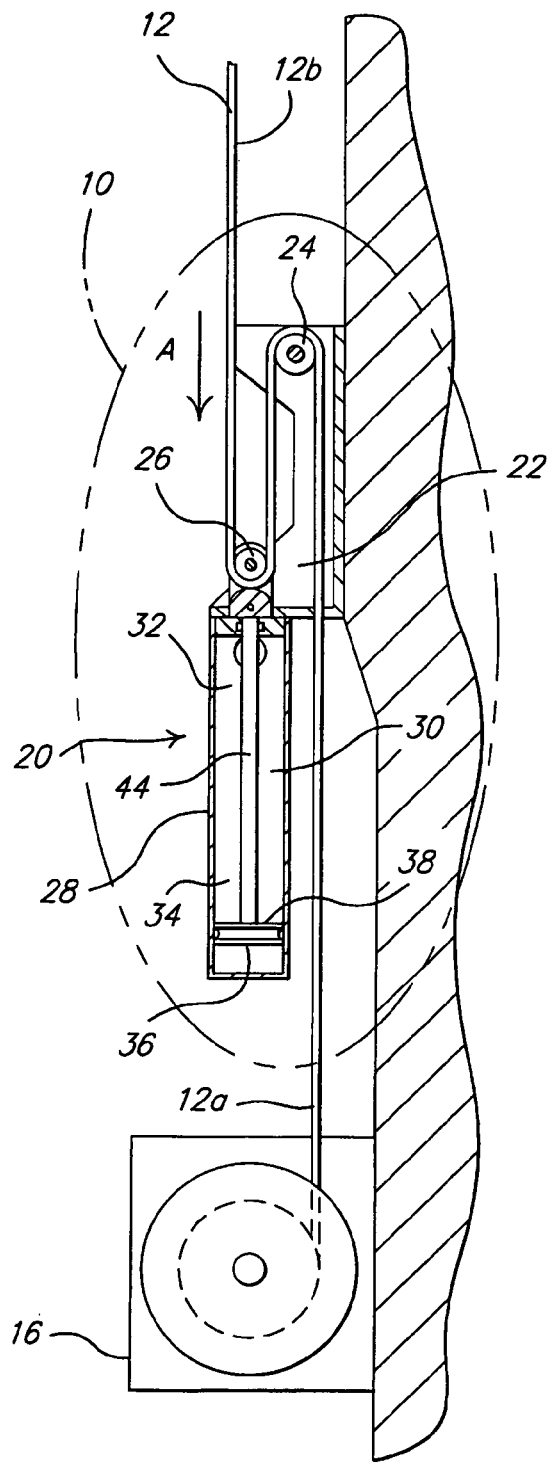

Referring to FIGS. 1, 2, and 4, activation mechanism 20 is operably coupled to pretensioner mechanism 10 via a connecting member 44 connecting actuator 36 to second guide member 26 such that the second guide member moves in correspondence with actuator 36 upon activation of the pretensioner assembly. In the embodiment shown, the connecting member operates in tension. Thus, the connecting member may be formed from steel, aluminum, or other metals or alloys into a relatively rigid member, such as a rod, or into a relatively pliable member, such as a length of cable. In an alternative embodiment, activation mechanism 20 may be arranged on a side of frame 22 opposite that shown in FIGS. 1 and 2. In this arrangement, activation mechanism 20 is configured to push, rather than pull, on second guide member 26 upon actuation, in the direction indicated by arrow A (FIG. 4). In this case, connecting member 44 is a substantially rigid member.

A gas generator 40 is provided in fluid communication with first end 32 of housing passage 30 and adjacent actuator pressure surface 38 for providing a gas pressure to actuator pressure surface 38. As is known in the art, gas generator 40 includes an initiator (not shown) and a quantity of a suitable gas generant composition (also not shown) in fluid communication with the initiator. Gas generator 40 may (but not necessarily) be formed as a "micro" gas generator as disclosed in U.S. Pat. No. 6,789,485, incorporated herein by reference. Gas generants useful in conjunction with the present invention are gas generants well known to those of ordinary skill in the art including cellulose-based compositions. Other examples include those described in U.S. Pat. Nos. 5,035,757, 5,460,668, 5,756,929, and 5,872,329, each herein incorporated by reference. These compositions exemplify, but do not limit, useful gas generant compositions. A gas port 42 is formed in housing 28 to enable fluid communication between housing passage 30 and gas generator 40. Gas generator 40 may be secured to housing 28, to frame 22, or to some other suitable portion of the vehicle interior.

Figure 3:
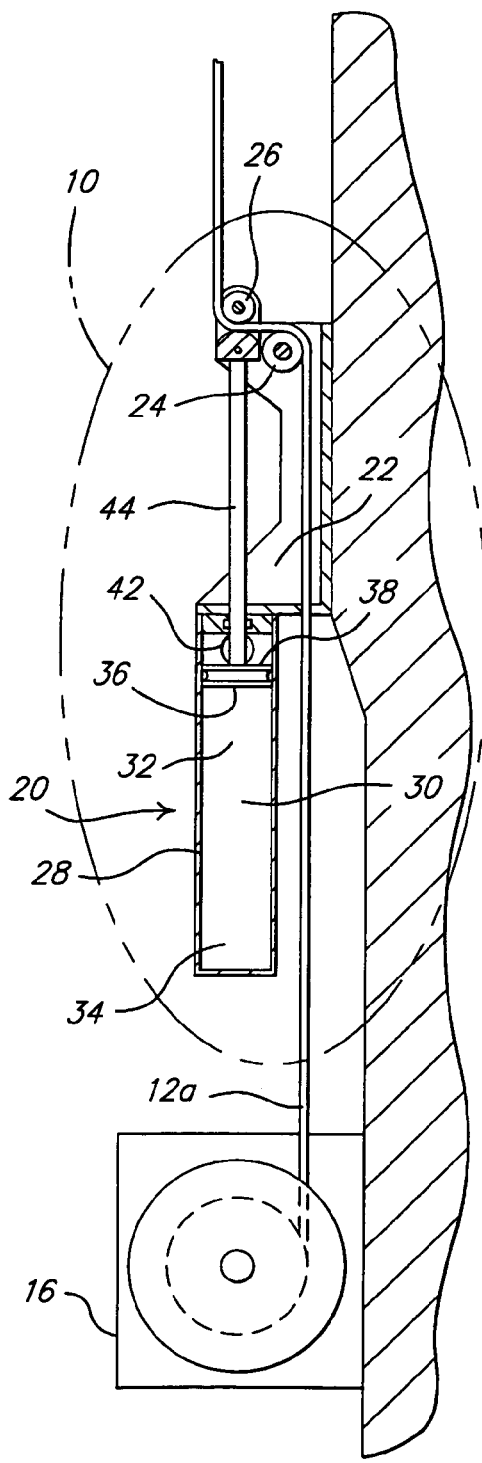
FIGS. 3 and 4 are edge views of the first embodiment of the pretensioner assembly shown in FIG. 1, showing operation of the first embodiment.

In operation, and referring to FIGS. 3 and 4, when activation of pretensioner assembly 10 is desired, for example in the event of a crash, a sensor (not shown) communicates electrical current via electrical contacts (not shown) to the initiator in gas generator 40. Energizing of the initiator causes the combustion of the gas generant composition in gas generator 40. The resulting pressurized gas enters housing passage 30 wherein the gas pressure in passage 30 begins to rise extremely rapidly, as does the pressure acting on actuator pressure surface 38. When a sufficient level of gas pressure is reached, actuator 36 begins to move through passage 30 from first end 32 toward second end 34, in the direction indicated by arrow A.

As actuator 36 moves toward housing passage second end 34, force is generated on detent mechanism 46 sufficient to disengage the detent mechanism, thereby releasing second guide member 26 from securement. For example, if detent mechanism 46 comprises a shear pin, sufficient force is generated by pressure of inflation gas on pressure surface 38 to cause shearing of the pin, thereby releasing second guide member 26. The shear pin may be selected to shear at a predetermined pressure in accordance with design requirements.

Thus, as actuator 36 moves toward housing passage second end 34, second guide member 26 is pulled in the direction of arrow A via attached connecting member 44. At this time, one end of belt 12 is immobilized by retractor mechanism 16. Also, an opposite end of belt 12 is immobilized by the belt buckle mechanism, and slack exists in the portion of the belt residing between the buckle mechanism and second guide portion 26. Movement of second guide member 26 with respect to first guide member 24 effectively increases a length of a portion of the safety belt extending between second guide member 26 and the buckle mechanism, thereby removing slack from the safety belt. At the end of travel of actuator 36 within housing passage 30, second guide member 26 has also reached its limit of downward travel and, having removed the slack from belt 12, becomes an additional, temporary anchor for the safety belt.

Pretensioner assembly 20 also serves a load-limiting function. As the vehicle occupant is thrown forward into safety belt 12, a tension force is exerted on the belt, causing second guide member 26 to retract, in the direction indicated by arrow B. This causes, via connecting member 44, a movement of actuator 36 and a corresponding compression of the gas contained in housing passage 30. This motion of second guide member 26 releases a slight amount of belt webbing, helping to absorb the impact force on the occupant and to aid in minimizing belt-inflicted injury.

In another embodiment, shown in FIGS. 5A-5C, second guide member 26 is attached to connecting member 44 via a hinge 60. In yet another embodiment, shown in FIGS. 6-7D, first guide member 24 is slidingly secured to frame 22 so as to be slidable between a first end position C and a second end position D. Movement of second guide member 26 with respect to first guide member 24 upon pretensioner actuation causes movement of first guide member 24 between first end position C and second end position D. The embodiments of the present invention shown in FIGS. 5A-5C and FIGS. 6-7D function in much the same manner as the embodiments shown in FIGS. 1-4. However, the different geometry illustrates how a varying design accomplishes the same goal without departing from the present invention's scope. In these embodiments, safety belt 12 is out of contact with guide members 24, 26 prior to pretensioner activation, and movement of second guide member 26 with respect to first guide member 24 upon pretensioner actuation produces coiling of the first portion of the safety belt about first guide member 24 and coiling of the second portion of the safety belt about second guide member 24.

Referring to FIG. 8, any of the pretensioner assembly embodiments described above may also be incorporated into a safety belt assembly 150. Safety belt assembly 150 includes a safety belt housing 152, a safety belt 151, a pretensioner assembly 20 in accordance with the present invention, and a retractor mechanism 154. Safety belt system 150 may be in communication with a crash event sensor 158 (for example, an inertia sensor or an accelerometer) including a known crash sensor algorithm that signals actuation of belt pretensioner 156 via, for example, activation of a the initiator in a gas generator (not shown). U.S. Pat. Nos. 6,505,790 and 6,419,177, previously incorporated herein by reference, provide illustrative examples of pretensioners actuated in such a manner.

Referring again to FIG. 8, safety belt assembly 150 may also be incorporated into a broader, more comprehensive vehicle occupant restraint system 180 including additional elements such as an airbag system 200. FIG. 8 shows a schematic diagram of one exemplary embodiment of such a restraint system. Airbag system 200 includes at least one airbag 202 and an inflator 204 coupled to airbag 202 so as to enable fluid communication with an interior of the airbag. Inflator 204 contains a combustible gas generant composition for generating inflation gas for inflating airbag 202, and at least one igniter for igniting the gas generant composition in the inflator. Examples of inflators which may be incorporated into airbag system 200 are described in U.S. Pat. Nos. 6,752,421, 5,806,888, and 6,341,799, all incorporated herein by reference. Airbag system 200 may also be in communication with a crash event sensor 210 including a known crash sensor algorithm that signals actuation of airbag system 200 via, for example, activation of airbag inflator 204 in the event of a collision.

It should be understood that the preceding is merely a detailed description of various embodiments of this invention and that numerous changes to the disclosed embodiments can be made in accordance with the disclosure herein without departing from the spirit or scope of the invention. The preceding description, therefore, is not meant to limit the scope of the invention.

What is claimed is:

1. A pretensioner mechanism for a safety belt comprising:
   a frame;
   a first guide member secured to the frame;
   a second guide member operably coupled to the frame;
   a first portion of a safety belt coiled about at least a portion of the first guide member prior to activation of the pretensioner mechanism and extending between a first safety belt securement and the second guide member; and
   a second portion of the safety belt coiled about at least a portion of the second guide member prior to activation of the pretensioner mechanism and extending between the first guide member and a second safety belt securement,
   the second guide member being operably coupled to the frame so as to enable movement of the second guide member with respect to the first guide member such that, upon pretensioner mechanism actuation, the second guide member moves with respect to the first guide member so as to increase a length of a portion of the safety belt extending between the second guide member and the second safety belt securement, thereby removing slack from the safety belt, wherein the first guide member is slidably engaged within a slot formed in said frame.

2. The pretensioner mechanism of claim 1 wherein the first safety belt securement is a safety belt retractor mechanism.

3. The pretensioner mechanism of claim 1 wherein the second safety belt securement is a safety belt buckle mechanism.

4. The pretensioner mechanism of claim 1 wherein the second guide member moves linearly with respect to the first guide member upon pretensioner actuation.

5. A pretensioner assembly comprising an activation mechanism operably coupled to the pretensioner mechanism of claim 1 for actuating the pretensioner mechanism.

6. The pretensioner assembly of claim 5 wherein the actuation mechanism is operably coupled to the pretensioner mechanism via a connecting member coupling the activation mechanism to the second guide member.

7. The pretensioner assembly of claim 1, wherein the connecting member comprises a cable or a rod.

8. The pretensioner assembly of claim 5 wherein the activation mechanism comprises:
   a housing with at least one passage, the passage having a first end and a second end;
   an actuator movable in the housing passage and having a pressure surface, the actuator being operably connected to the second guide member such that the second guide member moves in correspondence with the actuator;
   a gas generator in fluid communication with the first end of the passage and adjacent the actuator pressure surface for providing a gas pressure thereto, wherein upon pretensioner activation the gas generator provides a pressurized gas to the actuator pressure surface, thereby driving the actuator from the first end toward the second end of the passage, movement of the actuator producing a corresponding movement of the second guide member with respect to the first guide member so as to increase a length of a portion of the safety belt extending between the second guide member and the second safaty belt securement, thereby removing slack from the safety belt.

9. The pretensioner assembly of claim 8 wherein the fluid source is secured to the pretensioner frame.

10. The pretensioner mechanism of claim 1 wherein a portion of at least one of the first guide member or the second guide member is formed from a polymer compound.

11. The pretensioner mechanism of claim 1 wherein the first guide member comprises a rotatably-mounted roller.

12. A pretensioner mechanism for a safety belt comprising:
- a frame;
- a first guide member secured to the frame;
- a second guide member operably coupled to the frame;
- a first portion of a safety belt coiled about at least a portion of the first guide member prior to activation of the pretensioner mechanism and extending between a first safety belt securement and the second guide member; and
- a second portion of the safety belt coiled about at least a portion of the second guide member prior to activation of the pretensioner mechanism and extending between the first guide member and a second safety belt securement the second guide member being operably coupled to the frame so as to enable removement of the second guide member with respect to the first guide member such that, upon pretensioner mechanism actuatiom the second guide member moves with respect to the first guide member so as to increase a length of a portion of the safety belt extending between the second guide member and the second safety belt securement, thereby removing slack from the safety belt; and
- a detent mechanism for releasably securing the second guide member in a first position with respect to the first guide member.

13. The pretensioner mechanism of claim 12 wherein the detent mechanism comprises a shear pin in engagement with the second guide member and with a member that is mounted in a fixed spatial relationship with the first guide member.

14. The pretensioner mechanism of claim 13 wherein the member mounted in a fixed spatial relationship with the first guide member is the pretensioner mechanism frame.

15. The pretensioner mechanism of claim 12 wherein the detent mechanism comprises a deformation in a surface of the second guide member in engagement with a corresponding deformation in a surface of a member that is mounted in a fixed spatial relationship with the first guide member.

16. The pretensioner mechanism of claim 15 wherein the member mounted in a fixed spatial relationship with the first guide member is the pretensioner mechanism frame.

\* \* \* \* \*